(12) United States Patent
Ueda

(10) Patent No.: US 11,188,152 B2
(45) Date of Patent: Nov. 30, 2021

(54) OPERATION UNIT CONTROL DEVICE AND OPERATION UNIT CONTROL METHOD

(71) Applicant: MITSUBISHI ELECTRIC CORPORATION, Tokyo (JP)

(72) Inventor: Kiyoshi Ueda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 99 days.

(21) Appl. No.: 16/616,818

(22) PCT Filed: Jul. 5, 2017

(86) PCT No.: PCT/JP2017/024653
§ 371 (c)(1),
(2) Date: Nov. 25, 2019

(87) PCT Pub. No.: WO2019/008701
PCT Pub. Date: Jan. 10, 2019

(65) Prior Publication Data
US 2021/0173486 A1    Jun. 10, 2021

(51) Int. Cl.
*G06F 3/01* (2006.01)
*B60K 37/06* (2006.01)
*G06F 3/0362* (2013.01)

(52) U.S. Cl.
CPC ............. *G06F 3/016* (2013.01); *B60K 37/06* (2013.01); *G06F 3/0362* (2013.01); *B60K 2370/126* (2019.05); *B60K 2370/152* (2019.05)

(58) Field of Classification Search
CPC ....... G06F 3/016; G06F 3/0362; B60K 37/06; B60K 2370/152; B60K 2370/126
See application file for complete search history.

(56) References Cited

U.S. PATENT DOCUMENTS

| | | | | |
|---|---|---|---|---|
| 6,636,197 | B1* | 10/2003 | Goldenberg | G05G 1/08 345/156 |
| 2002/0057064 | A1* | 5/2002 | Onodera | H01H 25/00 318/2 |
| 2009/0119720 | A1* | 5/2009 | Deuel | G11B 27/105 725/75 |
| 2015/0185843 | A1* | 7/2015 | Olien | G06F 3/0338 345/174 |
| 2015/0277559 | A1* | 10/2015 | Vescovi | G06F 3/016 345/173 |
| 2015/0360564 | A1* | 12/2015 | Kalbus | H04W 4/48 701/36 |
| 2016/0162106 | A1* | 6/2016 | Jeon | G06F 3/1423 345/173 |
| 2018/0088777 | A1* | 3/2018 | Daze | G06F 3/0488 |

FOREIGN PATENT DOCUMENTS

JP    2014-216851 A    11/2014

* cited by examiner

*Primary Examiner* — Ariel A Balaoing
(74) *Attorney, Agent, or Firm* — Birch, Stewart, Kolasch & Birch, LLP

(57) ABSTRACT

When an operation using a knob and corresponding to the same function is performed simultaneously while an operation using a knob is being performed, the knobs are vibrated.

5 Claims, 8 Drawing Sheets

FIG. 10
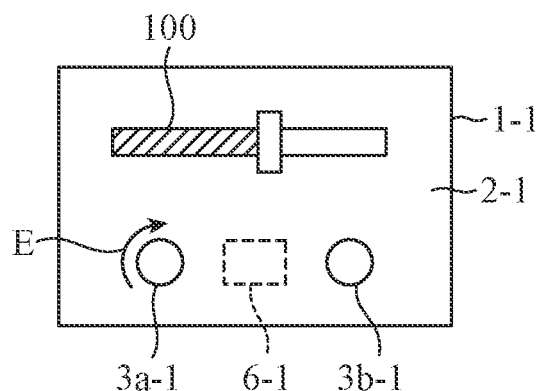
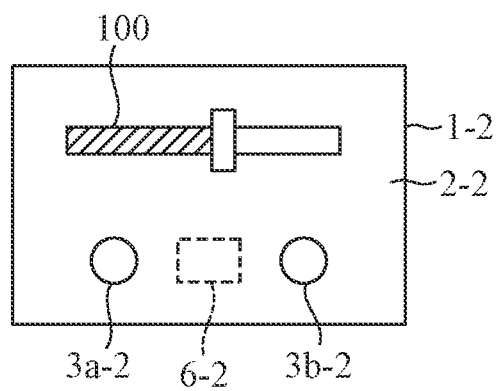 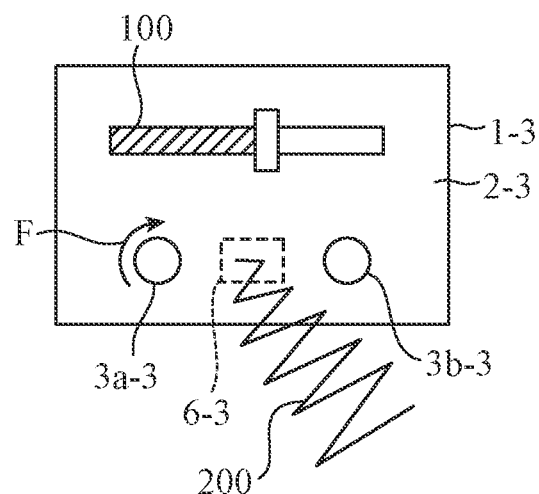

OPERATION UNIT CONTROL DEVICE AND OPERATION UNIT CONTROL METHOD

TECHNICAL FIELD

The present disclosure relates to an operation unit control device for and an operation unit control method of controlling a process corresponding to an operation on each of multiple operation units included in an operation device.

BACKGROUND ART

In recent years, vehicle-mounted displays have been upsized, and the number of displays mounted in a vehicle has also increased. User interfaces using a vehicle-mounted display have been also diversified. For example, in Patent Literature 1, a parameter setting device that allows users to rotate a knob to set up a parameter value while viewing a change in the parameter value displayed on a display screen is described. In this device, when a user operation of trying to set the parameter value to be outside a variable range is performed, vibrations are generated to provide tactile feedback via the knob. Users can recognize that they have performed an operation of trying to set the parameter value to be outside the variable range from the tactile feedback via the knob.

CITATION LIST

Patent Literature

Patent Literature 1: JP 2014-215851 A

SUMMARY OF INVENTION

Technical Problem

However, the device described in Patent Literature 1 handles only an operation using one knob, and operations using multiple knobs are not taken into consideration. Therefore, a problem is that when operations corresponding to the same function are simultaneously performed using multiple knobs, the device cannot handle the operations.

The present disclosure is made in order to solve the above-mentioned problem, and it is therefore an object of the present disclosure to provide an operation unit control device and an operation unit control method capable of guiding an operator in such a way that, while an operation using one of multiple operation units is being performed, the operator does not perform an operation corresponding to the same function by using one of the remaining operation units.

Solution to Problem

An operation unit control device according to the present disclosure includes: a processor to execute a program; and a memory to store the program which, when executed by the processor, performs processes of, detecting details of operations using two or more respective operation units included in an operation device; determining whether or not, while an operation using one of the operation units is being performed, an operation using a remaining one of the operation units and corresponding to a function identical with that corresponding to the operation using the one of the operation units is performed simultaneously, on the basis of the details of the operations, the details being detected; and vibrating the operation units when it is determined that while the operation using the one of the operation units is being performed, the operation using the remaining one of the operation units and corresponding to the function identical with that corresponding to the operation using the one of the operation units is performed simultaneously.

Advantageous Effects of Invention

According to the present disclosure, at the time that, while an operation using one of the operation units is being performed, an operation using a remaining one of the operation units and corresponding to a function identical with that corresponding to the operation using the one of the operation units is performed simultaneously, the operation units are vibrated to warn an operator that a prohibited operation is performed.

As a result, the operator can be guided in such a way as not to, while an operation using one of the operation units is being performed, perform an operation corresponding to an identical function by using a remaining one of the operation units.

BRIEF DESCRIPTION OF DRAWINGS

FIG. 10 is a diagram showing an overview of a warning process in the multiple operation devices.

DESCRIPTION OF EMBODIMENTS

Hereinafter, in order to explain the present disclosure in greater detail, embodiments of the present disclosure will be described with reference to the accompanying drawings.

Embodiment 1

Figure 1:
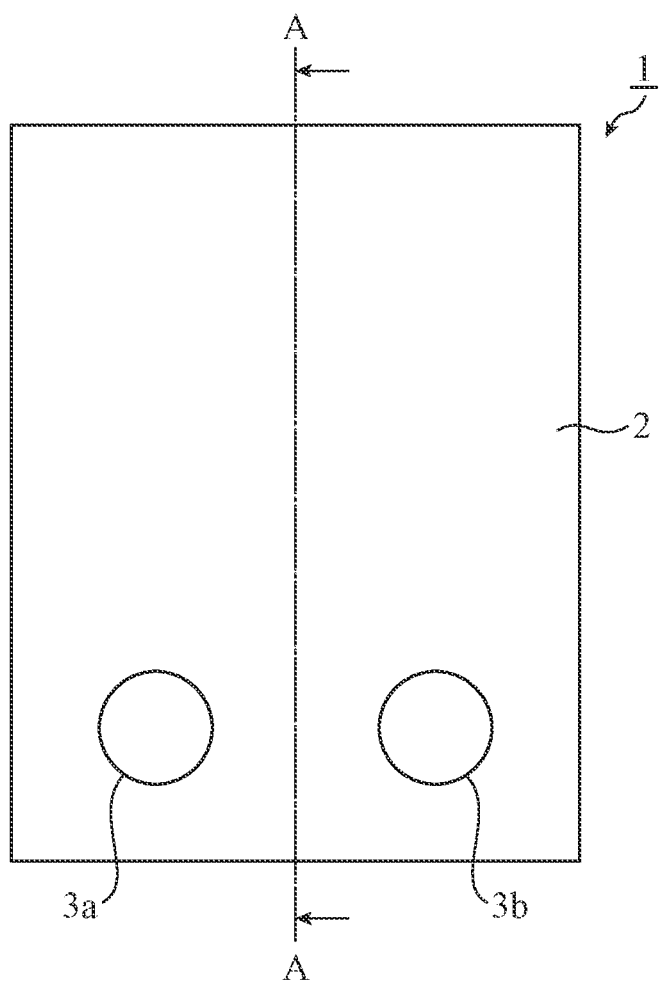
FIG. 1 is a diagram showing the appearance of an operation device in Embodiment 1 of the present disclosure.

FIG. 1 is a diagram showing the appearance of an operation device 1 in Embodiment 1 of the present disclosure.

The operation device 1 is provided in, for example, the center console in a vehicle, and receives an operation for performance of a function of vehicle-mounted equipment. The operation device 1 includes a display device 2, a knob 3a, and a knob 3b, as shown in FIG. 1. On the display device 2, functions to be operated using the knobs 3a and 3b are displayed, and a touch panel is mounted on the screen of the display device 2.

The knobs 3a and 3b are rotary knobs that can be rotated manually by an operator, and are mounted on the touch surface of the touch panel.

For example, a projecting portion that moves in accordance with rotation is provided in a lower surface of each of the knobs 3a and 3b, and moves in accordance with an operation of rotating each of the knobs 3a and 3b while the projecting portion is in contact with the touch surface. As the projecting portion moves on the touch surface, the operation of rotating each of the knobs 3a and 3b is converted into a touch operation.

Although multiple operation units included in the operation device 1 may be rotary knobs, the multiple operation units may be alternatively operation buttons each of which receives a pressing down operation.

For example, each operation unit preferably has a configuration that makes it possible to perform an operation on a portion of the operation unit, the portion projecting from the touch surface.

Such configuration enables the driver to grasp the position of each operation unit by groping for the operation unit without even viewing the screen of the display device 2, to operate the operation unit.

Further, the knobs 3a and 3b may be knobs which the operation device 1 is equipped with, instead of knobs mounted on the touch surface of the touch panel.

Figure 2:
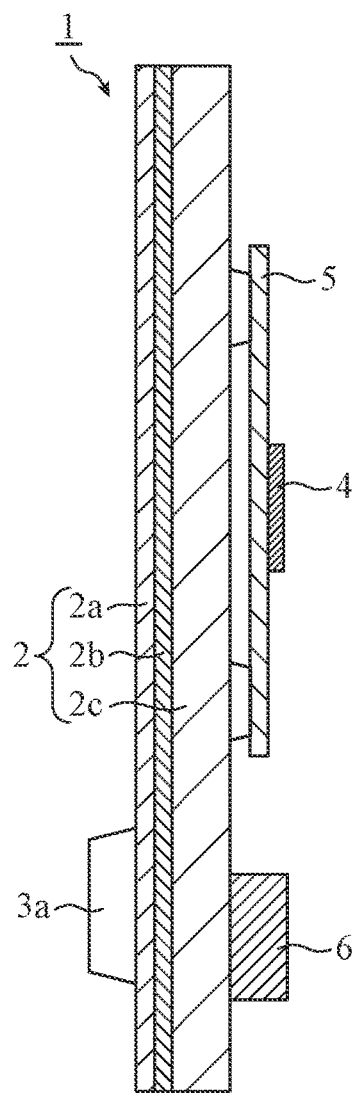
FIG. 2 is a cross-sectional arrow view of the operation device in Embodiment 1, taken along the line A-A in FIG. 1.

FIG. 2 is a cross-sectional arrow view of the operation device 1, taken along the line A-A in FIG. 1.

The display device 2 includes cover glass 2a, the touch panel 2b, and a liquid crystal module 2c, as shown in FIG. 2. The touch panel 2b is mounted on a display surface side of the display device 2 in such a way as to cover the display surface of the liquid crystal module 2c. The cover glass 2a is mounted on the display surface side of the display device 2 in such a way as to cover the touch surface of the touch panel 2b. The cover glass 2a is a glass member for protection of the touch surface. A change in a rotation angle caused by an operation of rotating each of the knobs 3a and 3b is converted by the touch panel 2b into an electrical signal.

Although an explanation is made hereinafter by taking, as an example, the configuration in which the display device 2 includes the cover glass 2a, a protection plate that is a resin member, instead of the cover glass 2a, may be mounted on the touch panel 2b.

A microcomputer 4, a control board 5, and an actuator 6 are provided on a rear surface of the liquid crystal module 2c, as shown in FIG. 2. The microcomputer 4 detects an input operation on the touch panel 2b, controls display by the liquid crystal module 2c, and controls the actuator 6. The control board 5 is one on which the microcomputer 4 is mounted, and has a wire electrically connecting the microcomputer 4 and the liquid crystal module 2c and a wire electrically connecting the microcomputer 4 and the actuator 6.

The actuator 6 drives a vibrator to generate vibrations.

One vibrator is provided for one operation device 1, for example.

The actuator 6 can drive the vibrator and change the mode of vibrations under the control of the microcomputer 4, for example. The mode of vibrations includes at least one of the strength, the frequency, the time interval, and the rhythm of vibrations.

Figure 3:
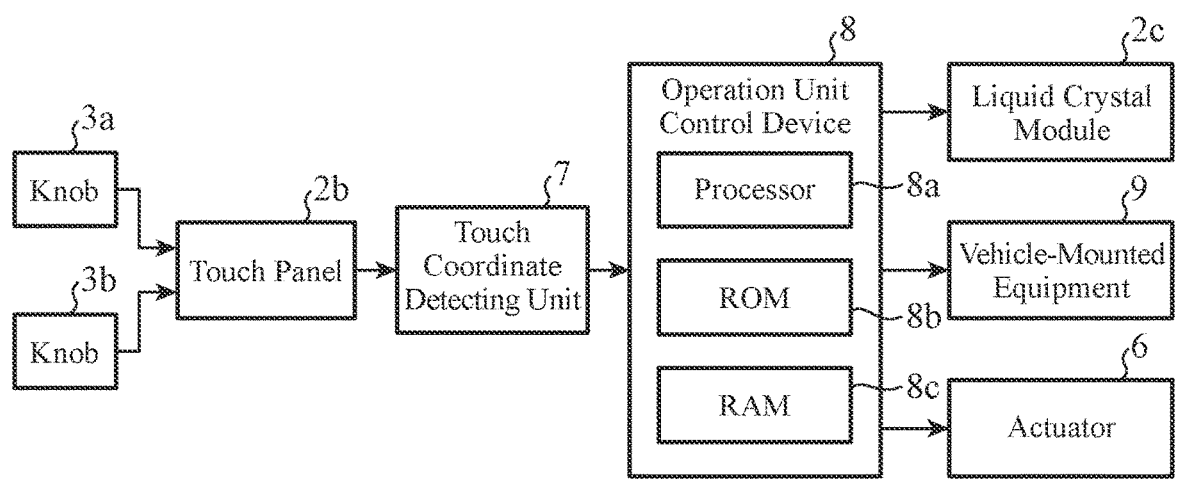
FIG. 3 is a block diagram showing the hardware configuration of the operation device and an operation unit control device in Embodiment 1.

FIG. 3 is a block diagram showing the hardware configuration of the operation device 1 and an operation unit control device 8 in Embodiment 1. The operation device 1 shown in FIGS. 1 and 2 includes the touch panel 2b, the liquid crystal module 2c, the knobs 3a and 3b, the actuator 6, and a touch coordinate detecting unit 7 which are shown in FIG. 3.

Although the case in which the operation unit control device 8 is separate from the operation device 1 is shown, the operation device 1 and the operation unit control device 8 may be integral with each other in Embodiment 1.

In the touch panel 2b that is of capacitive type, when an operator touches the touch surface thereof with a hand, its capacitance changes, and also when an operator touches each of the knobs 3a and 3b with a hand, its capacitance changes. An electrical signal corresponding to a change in the capacitance is outputted from the touch panel 2b to the touch coordinate detecting unit 7. The touch coordinate detecting unit 7 detects a coordinate position operated by an operator on the touch surface and a detection sensitivity level on the basis of the electrical signal inputted from the touch panel 2b.

The touch coordinate detecting unit 7 is implemented by, for example, the microcomputer 4 shown in FIG. 2.

In accordance with an operation on each of the knobs 3a and 3b, the operation unit control device 8 controls the liquid crystal module 2c controls the driving of the vibrator by the actuator 6, and instructs the vehicle-mounted equipment 9 to perform the function corresponding to the details of the operation.

The operation unit control device 8 is implemented by, for example, the microcomputer 4 shown in FIG. 2, and includes a processor 8a, a read only memory (ROM) 8b, and a random access memory (RAM) 8c. The operation unit control device 8 controls a process corresponding to an operation on each of the knobs 3a and 3b.

The operation unit control device 8 may be implemented by a microcomputer provided separately from the microcomputer 4.

The processor 8a is a calculation processing circuit that performs various types of calculating processes in the operation unit control device 8, and is hardware called a processor, a calculation processing circuit, an electric circuit, a controller, or the like. The processor 8a includes a single calculation processing circuit or a set of two or more calculation processing circuits. Further, the processor 8a can read a program from the ROM 8b, load this program into the RAM 8c, and thereby perform a calculating process.

The ROM 8b is a nonvolatile storage device that stores one or more programs. The RAM 8c is a volatile storage device that the processor 8a uses as a loading area for programs and various pieces of information. The ROM 8b and the RAM 8c are constituted by, for example, semiconductor memory devices, and can also be called memories.

Although the ROM 8b is shown as an example of the storage device that stores one or more programs that the processor 8a executes, the storage device is not limited to this ROM. For example, the storage device may be a nonvolatile mass storage device such as a hard disk drive (HDD) or a solid state drive (SSD), the nonvolatile mass storage device being called storage. Further, storage devices including storage may be generically called memories.

The vehicle-mounted equipment 9 is electronic equipment which is mounted in a vehicle and whose function is operated by the operation device 1. For example, the vehicle-mounted equipment 9 is vehicle-mounted audio equipment, a vehicle-mounted navigation device, or a vehicle-mounted air conditioner.

Although the configuration in which the single piece of vehicle-mounted equipment 9 is connected to the operation unit control device 8 is shown in FIG. 3, multiple pieces of vehicle-mounted equipment 9 may be connected to the operation unit control device 8.

Figure 4:
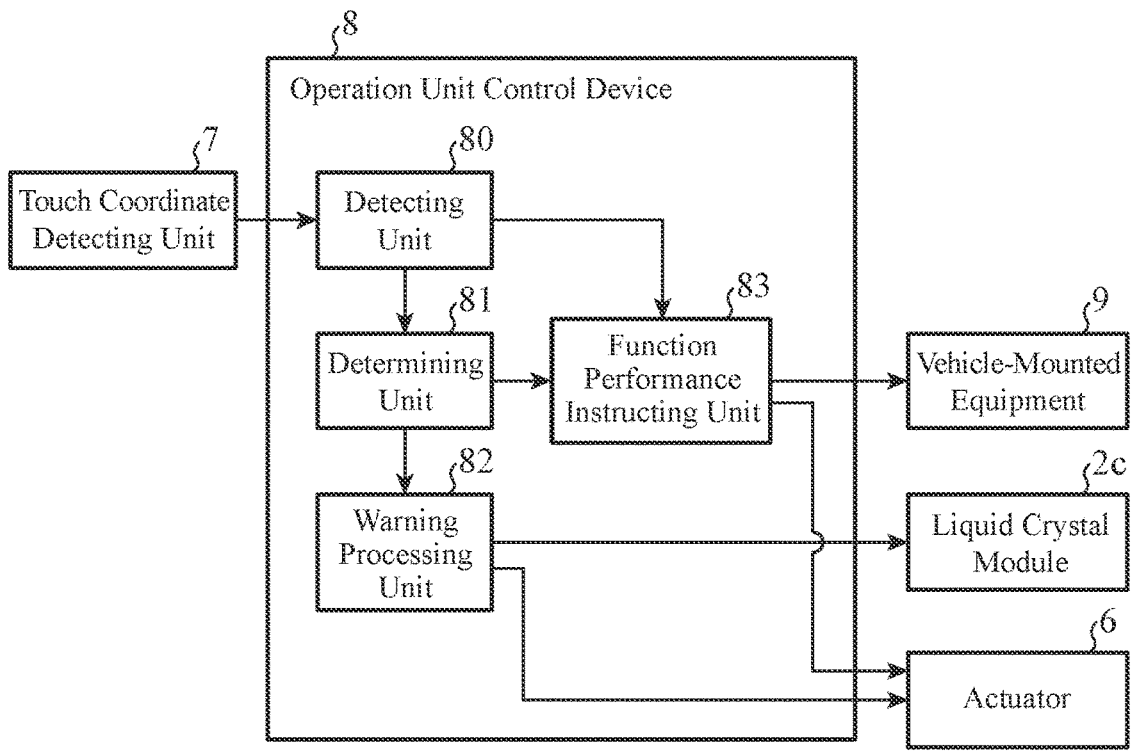
FIG. 4 is a block diagram showing the functional configuration of the operation unit control device according to Embodiment 1.

FIG. 4 is a block diagram showing the functional configuration of the operation unit control device 8.

The operation unit control device 8 includes a detecting unit 80, a determining unit 81, a warning processing unit 82, and a function performance instructing unit 83, as shown in FIG. 4.

The detecting unit 80 detects the details of an operation using each of the knobs 3*a* and 3*b* on the basis of the coordinate position on the touch surface of the touch panel 2*b* and the detection sensitivity level that are detected by the touch coordinate detecting unit 7. For example, the function corresponding to the operation and the amount of operation are detected as the details of the operation. In a case in which the vehicle-mounted equipment 9 is audio equipment, a volume control function is provided as a function. Further, the amount of operation can be defined as the amount of change in the rotation angle corresponding to an operation of rotating each of the knobs 3*a* and 3*b*.

The determining unit 81 determines whether or not, while an operation using one of the knobs 3*a* and 3*b* is being performed, an operation using the remaining knob and corresponding to the same function as the operation using the one of the knobs is performed simultaneously, on the basis of the details of the operations, the details being detected by the detecting unit 80.

For example, the determining unit 81 performs the determination on the basis of both the details of the operation using the knob 3*a*, the details being detected by the detecting unit 80, and the details of the operation using the knob 3*b*, the details being detected by the detecting unit 80.

A determination as to whether or not operations corresponding to the same function are being performed using both of the knobs 3*a* and 3*b*, or a determination as to whether or not, while an operation using the knob 3*a* (or 3*b*) is being performed, an operation using the knob 3*b* (or 3*a*) and corresponding to the same function is performed is performed.

When the determining unit 81 determines that, while an operation using one of the knobs 3*a* and 3*b* is being performed, an operation using the remaining knob and corresponding to the same function is performed simultaneously, the warning processing unit 82 vibrates the knobs 3*a* and 3*b*.

For example, when an operation corresponding to the same function is performed using the knob 3*b* while an operation using the knob 3*a* is being performed, the warning processing unit 82 controls the actuator 6 to vibrate the knobs 3*a* and 3*b*. The process of providing vibrations for the knobs 3*a* and 3*b* in this way is a warning process for the operator.

When the determining unit 81 determines that, while an operation using one of the knobs is being performed, an operation using the remaining knob and corresponding to the same function is performed simultaneously, the warning processing unit 82 may change the display mode of the display device 2 included in the operation device 1.

For example, when an operation corresponding to the same function is performed using the knob 3*b* while an operation using the knob 3*a* is being performed, the warning processing unit 82 shrinks or deletes the display of the function for which an operation is received through the knob 3*b*, out of the functions displayed on the display device 2.

Because the display mode is changed at the time that an operation corresponding to the same function is performed using the knob 3*b* while an operation using the knob 3*a* is being performed, the operator can grasp that an operation using the knob 3*b* is prohibited.

The function performance instructing unit 83 instructs the vehicle-mounted equipment 9 to perform the function corresponding to the details of the operation using the knob 3*a* or 3*b*, out of the functions that the vehicle-mounted equipment 9 has.

For example, in the case in which the vehicle-mounted equipment 9 is vehicle-mounted audio equipment, when an operation of controlling the volume of an audio sound is performed using the knob 3*a*, the function performance instructing unit 83 instructs the vehicle-mounted audio equipment to perform volume control.

Further, when an operation using each of the knobs 3*a* and 3*b* is performed, the function performance instructing unit 83 may control the actuator 6, to provide tactile feedback using vibrations for the operator. Vibrations implementing tactile feedback have a mode different from that in the warning process.

For example, the function performance instructing unit 83 controls the actuator 6, to generate vibrations in such a way that the vibrations follow a change in the rotation angle of the knob 3*a*.

Vibrations provided for the knob 3*a* at this time have a mode in which the vibrations provide an operation feeling for the operator.

For example, a change in the rotational resistance when an operation of rotating the knob 3*a* is performed is expressed by a continuous amplitude change of vibrations, thus providing the feedback for the operator.

Next, the operations will be explained.

Figure 5:
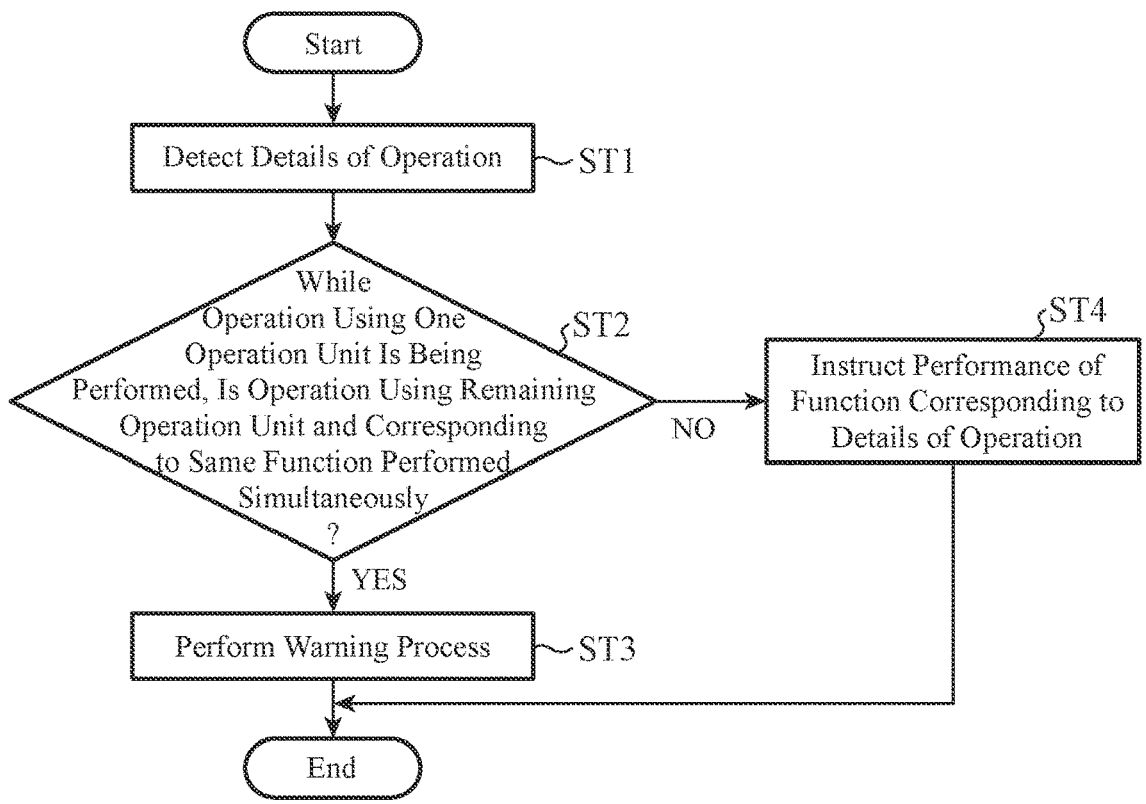
FIG. 5 is a flow chart showing an operation unit control method according to Embodiment 1.

FIG. 5 is a flow chart showing an operation unit control method according to Embodiment 1.

The detecting unit 80 detects the details of an operation using at least one of the knobs 3*a* and 3*b* on the basis of information inputted from the touch coordinate detecting unit (step ST1).

For example, the detecting unit 80 detects both the function corresponding to an operation using a knob, and the amount of operation, on the basis of the coordinate position on the touch surface and the detection sensitivity level that are detected by the touch coordinate detecting unit 7.

The determining unit 81 determines whether or not, while an operation using one of the knobs 3*a* and 3*b* is being performed, an operation using the remaining knob and corresponding to the same function is performed simultaneously, on the basis of the details of the operations, the details being detected by the detecting unit 80 (step ST2).

For example, when an operation using the knob 3*b* is performed while an operation using the knob 3*a* is being performed, and the function corresponding to the operation using the knob 3*a* and the function corresponding to the operation using the knob 3*b* are the same, the determining unit determines that the operation using the knob 3*b* and corresponding to the same function is performed simultaneously while the operation using the knob 3*a* is being performed.

When determining that, while an operation using one of the knobs is being performed, an operation using the remaining knob and corresponding to the same function is performed simultaneously (YES in step ST2), the determining unit 81 notifies the warning processing unit 82 of the determination result. When receiving the notification of the above-mentioned determination result from the determining unit 81, the warning processing unit 82 performs a warning process (step ST3).

In contrast, when determining that, while an operation using one of the knobs is being performed, no operation using the remaining knob and corresponding to the same function is performed simultaneously (NO in step ST2), the determining unit 81 notifies the function performance instructing unit 83 of this determination result.

When receiving the notification of the above-mentioned determination result from the determining unit 81, the function performance instructing unit 83 instructs the vehicle-mounted equipment 9 to perform the function corresponding to the operation using the knob (step ST4).

Figure 6A:
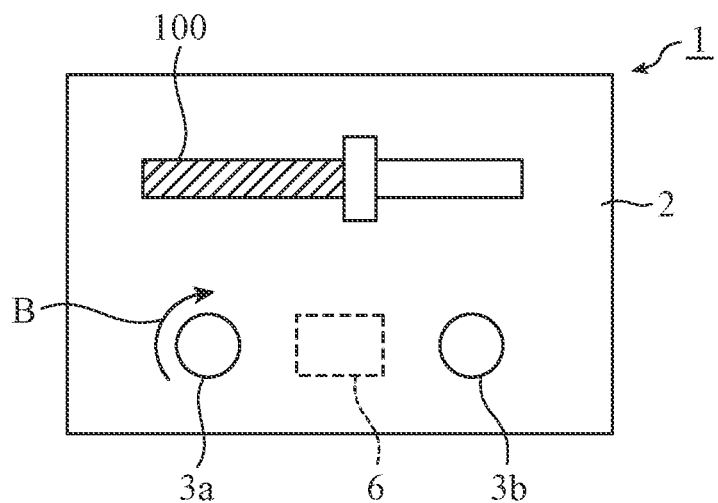
FIG. 6A is a diagram showing a situation in which, in the operation device having two knobs, an operation using one of the knobs is performed.

FIG. 6A is a diagram showing a situation in which an operation using the knob 3*a* is performed in the operation device 1 having the knobs 3*a* and 3*b*. In FIG. 6A, a slider 100 for volume control is displayed on the display device 2. The position of the knob of the slider 100 can be moved in accordance with an operation of rotating each of the knobs 3*a* and 3*b*.

For example, when an operator rotates the knob 3*a* in a direction of an arrow B, to move the position of the knob of the slider 100, the function performance instructing unit 83 outputs control information indicating a sound volume corresponding to the position of this knob to the vehicle-mounted audio equipment. When receiving the control information from the function performance instructing unit 83, the vehicle-mounted audio equipment controls the output of the audio sound in such a way that the output has the sound volume indicated by the control information.

Figure 6B:
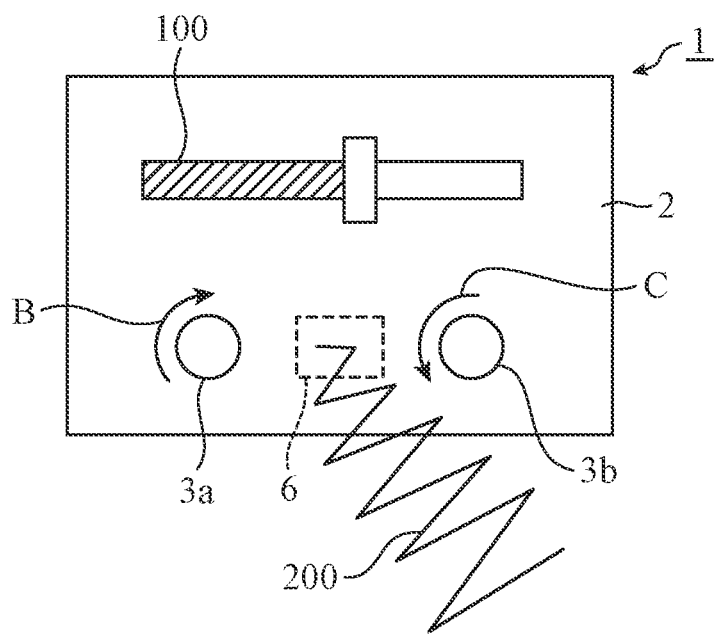
FIG. 6B is a diagram showing an overview of a warning process in the operation device of FIG. 6A.

FIG. 6B is a diagram showing an overview of the warning process in the operation device 1 of FIG. 6A. In FIG. 6B, an operator rotates the knob 3*b* in a direction of an arrow C while rotating the knob 3*a* in a direction of an arrow B to move the position of the knob of the slider 100.

In this case, the function corresponding to the operation of rotating the knob 3*b* is the volume control function, and is the same as that corresponding to the operation of rotating the knob 3*a*. Therefore, the determining unit 81 determines that the operation using the knob 3*b* and corresponding to the same function is performed simultaneously while the operation using the knob 3*a* is being performed.

When a notification of the above-mentioned determination result is provided from the determining unit 81, the warning processing unit 82 controls the actuator 6 to provide vibrations 200 for the knobs 3*a* and 3*b*, as shown in FIG. 6B. The vibrations 200 have a mode different from that of vibrations in tactile feedback for an operation on each of the knobs 3*a* and 3*b*.

For example, although vibrations provided as tactile feedback for an operation on each of the knobs 3*a* and 3*b* are generated continuously, following an operation of rotating the knob 3*a* or 3*b*, the vibrations 200 in the warning process are generated intermittently at certain time intervals.

From the vibrations 200 generated in the knobs 3*a* and 3*b*, the operator can grasp that he or she cannot operate the same function using the knob 3*b* simultaneously while an operation using the knob 3*a* is being performed. Further, the vibrations 200 in the warning process may have a strength, a frequency, or a rhythm different from that of vibrations provided as tactile feedback for an operation on each of the knobs 3*a* and 3*b*. As a result, the difference with the vibrations 200 in the warning process is made clearer.

Further, in addition to the warning process of vibrating the knobs 3*a* and 3*b*, the display mode of the display device 2 may be changed.

Figure 7A:
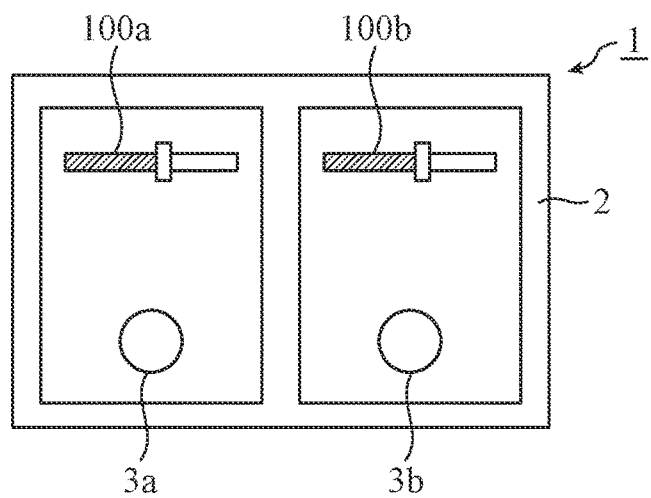
FIG. 7A is a diagram showing a screen displaying functions in the operation device having the two knobs.

FIG. 7A is a diagram showing a screen displaying the functions in the operation device 1 having the knobs 3*a* and 3*b*. In FIG. 7A, both a slider 100*a* and a slider 100*b* for volume control are displayed on the display device 2. The position of the knob of the slider 100*a* can be moved in accordance with an operation of rotating the knob 3*a*. The position of the knob of the slider 100*b* can be moved in accordance with an operation of rotating the knob 3*b*.

Figure 7B:
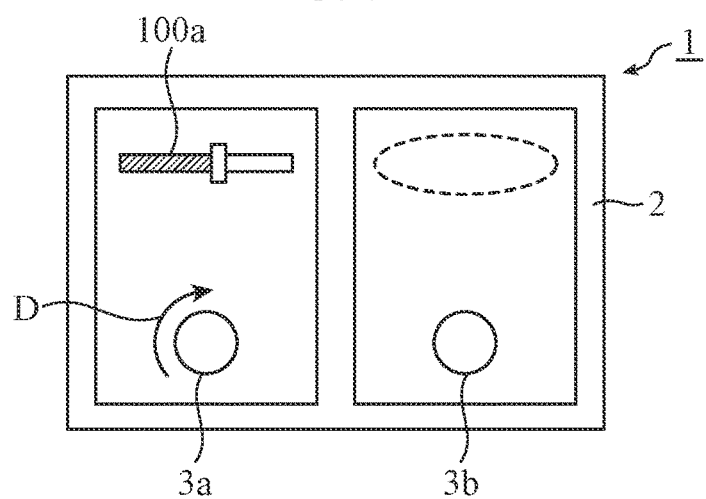
FIG. 7B is a diagram showing an overview of a warning process in the operation device of FIG. 7A.

FIG. 7B is a diagram showing an overview of the warning process in the operation device 1 of FIG. 7A.

For example, an operator rotates the knob 3*b* to move the position of the knob of the slider 100*b* while rotating the knob 3*a* in a direction of an arrow D to move the position of the knob of the slider 100*a*. At this time, the determining unit 81 determines that an operation using the knob 3*b* and corresponding to the same function is performed simultaneously while an operation using the knob 3*a* is being performed.

When a notification of the above-mentioned determination result is provided from the determining unit 81, the warning processing unit 82 controls the display device 2 to delete the slider 100*b* as shown by a broken line in FIG. 7B.

From the deletion of the slider 100*b*, the operator can grasp that volume control using the knob 3*b* is prohibited while volume control using the knob 3*a* is being performed.

As a result, the operator can be guided in such a way as not to perform an operation corresponding to the same function by using the knob 3*b* while performing an operation using the knob 3*a*.

Figure 7C:
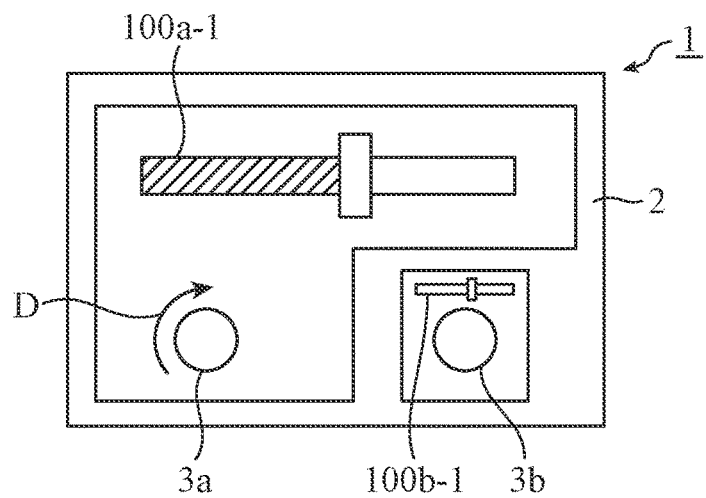
FIG. 7C is a diagram showing an overview of another example of the warning process in the operation device of FIG. 7A.

FIG. 7C is a diagram showing an overview of another example of the warning process in the operation device 1 of FIG. 7A.

When a notification of the above-mentioned determination result is similarly provided from the determining unit 81, the warning processing unit 82 controls the display device 2, to change the slider 100*a* to an enlarged slider 100*a*-1 and further change the slider 100*b* to a shrunk slider 100*b*-1, as shown in FIG. 7C.

The operator can grasp that volume control using the knob 3*b* cannot be performed while volume control using the knob 3*a* is being performed, by visually recognizing the screen in which the slider 100*a* is enlarged and the slider 100*b* is shrunk. Also in this case, the operator can be guided in such a way as not to perform an operation corresponding to the same function by using the knob 3*b* while performing an operation using the knob 3*a*.

The warning processing unit 82 may change the display mode of an area in which the knob 3*a* is provided, and the display mode of an area in which the knob 3*b* is provided.

For example, when providing guidance in such a way that an operation using the knob 3*b* is not performed, the warning processing unit 82 may control the display device 2 to increase the brightness of the area in which the knob 3*a* is provided and decrease the brightness of the area in which the knob 3*b* is provided. In this example, in a case in which the knobs 3*a* and 3*b* are each made from a transparent material, each of the knobs themselves is made to become bright or dark. As a result, the operator can be guided in such a way as not to perform an operation corresponding to the same function by using the knob 3*b* while performing an operation using the knob 3*a*.

Further, the determining unit 81 may determine whether or not the function is one for which operations using the knobs 3a and 3b are allowed to be performed simultaneously.

For example, when an operation using the knob 3b and corresponding to the same function is performed simultaneously while an operation using the knob 3a is being performed, the determining unit 81 determines whether or not the function for which the operations are being performed is a function for which operations using the knobs 3a and 3b are allowed to be performed simultaneously (referred to as a simultaneity allowable function hereinafter).

When the determining unit 81 determines that the function is a simultaneity allowable function, the warning processing unit 82 does not vibrate the knobs 3a and 3b.

The function performance instructing unit 83 instructs the vehicle-mounted equipment 9 to perform the function corresponding to the operations using the knobs 3a and 3b. As a result, the vehicle-mounted equipment 9 performs the simultaneity allowable function.

When the determining unit 81 determines that the function is a simultaneity allowable function, the warning processing unit 82 does not have to change the display mode of the display device 2, in addition to not vibrating the knobs 3a and 3b.

As mentioned above, in the operation unit control device 8 according to Embodiment 1, the detecting unit 80 detects the details of an operation using each of the knobs 3a and 3b included in the operation device 1. The determining unit 81 determines whether or not, while an operation using one of the knobs 3a and 3b is being performed, an operation using the remaining knob and corresponding to the same function is performed simultaneously, on the basis of the details of the operations, the details being detected by the detecting unit 80. When the determining unit 81 determines that, while an operation using one of the knobs is being performed, an operation using the remaining knob and corresponding to the same function is performed simultaneously, the warning processing unit 82 vibrates the knobs 3a and 3b.

By configuring in this way, at the time that an operation using the knob 3b and corresponding to the same function is performed simultaneously while an operation using the knob 3a is being performed, the knobs 3a and 3b are vibrated to warn the operator that a prohibited operation is performed, for example.

As a result, the operator can be guided in such a way as not to perform an operation corresponding to the same function by using the knob 3b while an operation using the knob 3a is being performed.

In the operation unit control device 8 according to Embodiment 1, when the determining unit 81 determines that, while an operation using one of the knobs is being performed, an operation using one of the remaining knobs and corresponding to the same function is performed simultaneously, the warning processing unit 82 changes the display mode of the display device 2.

By configuring in this way, for example, the display mode of the display device 2 is changed at the time that an operation using the knob 3b and corresponding to the same function is performed simultaneously while an operation using the knob 3a is being performed. The operator can grasp that an operation corresponding to the same function cannot be performed using the knob 3b, by visually recognizing the change in the display mode.

In the operation unit control device 8 according to Embodiment 1, as tactile feedback for an operation using the knob 3a or 3b, the function performance instructing unit 83 vibrates the knob 3a or 3b in a mode different from that in the warning process.

By configuring in this way, an operation feeling corresponding to an operation using the knob 3a or 3b can be provided for the operator.

In the operation unit control device 8 according to Embodiment 1, when, while an operation using one of the knobs is being performed, an operation corresponding to the same function is performed simultaneously using one of the remaining knobs, the determining unit 81 determines whether or not the function for which the operations are being performed is a simultaneity allowable function. When the determining unit 81 determines that the function is a simultaneity allowable function, the warning processing unit 82 does not vibrate the knobs 3a and 3b. As a result, the simultaneity allowable function can be performed through the operations using both of the knobs 3a and 3b.

Embodiment 2

Figure 8:
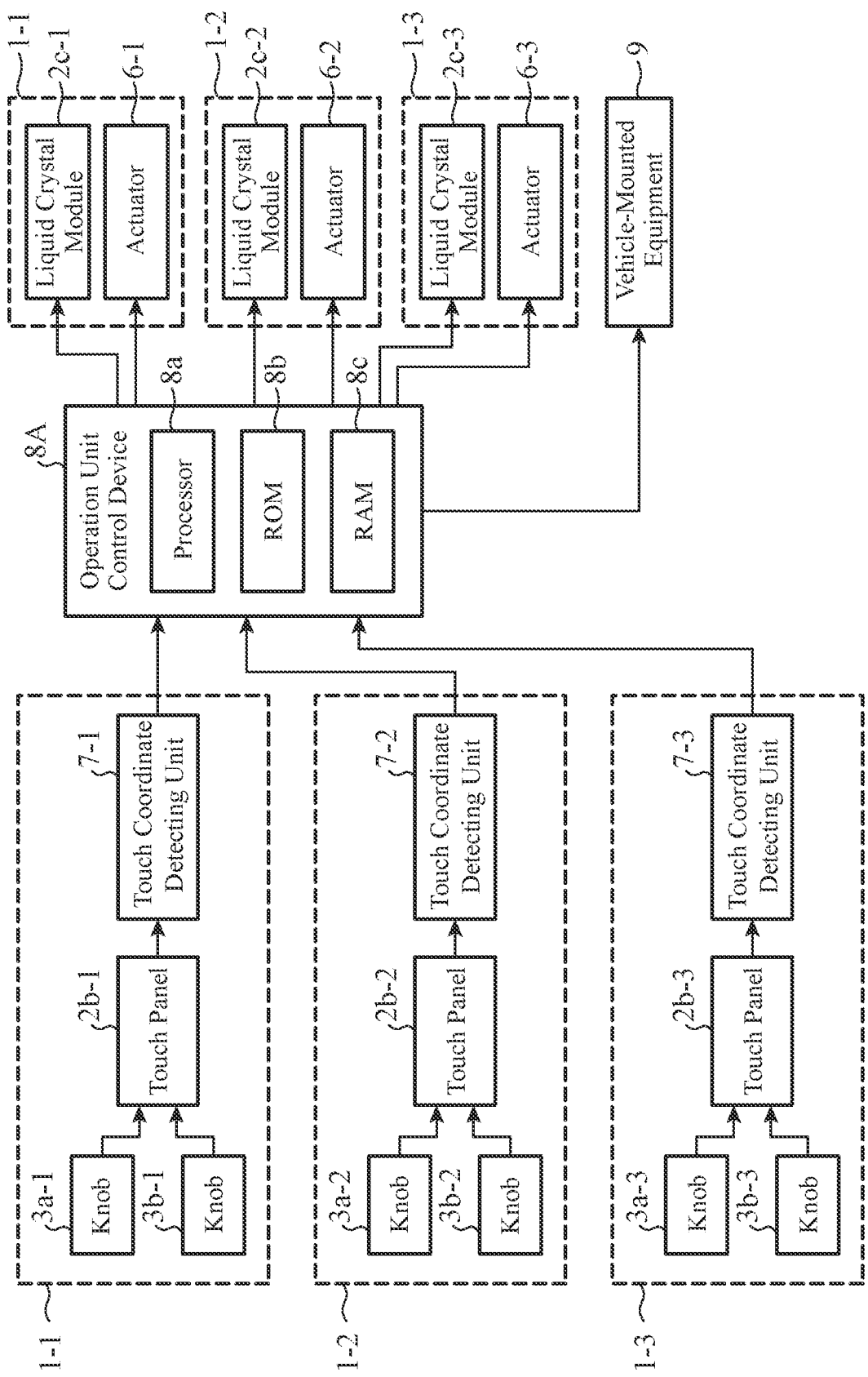
FIG. 8 is a block diagram showing the hardware configuration of multiple operation devices and an operation unit control device in Embodiment 2 of the present disclosure.

FIG. 8 is a block diagram showing the hardware configuration of operation devices 1-1 to 1-3 and an operation unit control device 8A in Embodiment 2 of the present disclosure.

The operation unit control device 8A is connected to each of the operation devices 1-1 to 1-3 and is connected to vehicle-mounted equipment 9, as shown in FIG. 8.

The operation devices 1-1 to 1-3 include touch panels 2b-1 to 2b-3, liquid crystal modules 2c-1 to 2c-3, knobs 3a-1 to 3a-3, knobs 3b-1 to 3b-3, actuators 6-1 to 6-3, and touch coordinate detecting units 7-1 to 7-3.

Although the case in which the operation unit control device 8A is separate from the operation devices 1-1 to 1-3 is shown, each of the operation devices 1-1 to 1-3 and the operation unit control device 8A may be integral with each other in Embodiment 2.

The knobs 3a-1 to 3a-3 and 3b-1 to 3b-3 are rotary knobs that can be rotated manually by operators, like the knobs 3a and 3b shown in Embodiment 1, and are mounted on the touch surfaces of the respective touch panels 2b-1 to 2b-3.

Multiple operation units included in the operation devices 1-1 to 1-3 may be rotary knobs, or may be operation buttons that receive pressing down operations.

In the touch panels 2b-1 to 2b-3, when operators touch the touch surfaces thereof with hands, their capacitances change, and, also when operators touch the knobs 3a-1 to 3a-3 and 3b-1 to 3b-3 with hands, their capacitances change. Electrical signals corresponding to changes in the capacitances are outputted from the touch panels 2b-1 to 2b-3 to the touch coordinate detecting units 7-1 to 7-3.

The touch coordinate detecting units 7-1 to 7-3 detect coordinate positions operated by operators on the touch surfaces and detection sensitivity levels on the basis of the electrical signals inputted from the touch panels 2b-1 to 2b-3.

The operation unit control device 8A includes a processor 8a, a ROM 8b, and a RAM 8c, and controls a process corresponding to an operation on each of the knobs 3a-1 to 3a-3 and 3b-1 to 3b-3.

The processor 8a is a calculation processing circuit that performs various types of calculating processes in the operation unit control device 8A, and is hardware called a processor, a calculation processing circuit, an electric circuit, a controller, or the like. The processor 8a includes a single calculation processing circuit or a set of two or more calculation processing circuits. Further, the processor 8a can read a program from the ROM 8*b*, load this program into the RAM 8*c*, and thereby perform a calculating process.

The ROM 8*b* is a nonvolatile storage device that stores one or more programs. The RAM 8*c* is a volatile storage device that the processor 8*a* uses as a loading area for programs and various pieces of information. The ROM 8*b* and the RAM 8*c* are constituted by, for example, semiconductor memory devices, and can also be called memories.

Although the ROM 8*b* is shown as an example of the storage device that stores one or more programs that the processor 8*a* executes, the storage device is not limited to this ROM. For example, the storage device may be a nonvolatile mass storage device such as an HDD or an SSD, the nonvolatile mass storage device being called storage. Further, storage devices including storage may be generically called memories.

In accordance with an operation on each of the knobs 3*a*-1 to 3*a*-3 and 3*b*-1 to 3*b*-3, the operation unit control device 8A controls the liquid crystal modules 2*c*-1 to 2*c*-3, controls the driving of vibrators performed by the actuators 6-1 to 6-3, and instructs the vehicle-mounted equipment 9 to perform the function corresponding to the details of the operation.

The vehicle-mounted equipment 9 is electronic equipment which is mounted in a vehicle and whose function is operated by the operation devices 1-1 to 1-3. For example, the vehicle-mounted equipment 9 is vehicle-mounted audio equipment, a vehicle-mounted navigation device, or a vehicle-mounted air conditioner.

Although the configuration in which the single piece of vehicle-mounted equipment 9 is connected to the operation unit control device 8A is shown in FIG. 8, multiple pieces of vehicle-mounted equipment 9 may be connected to the operation unit control device 8A.

Figure 9:
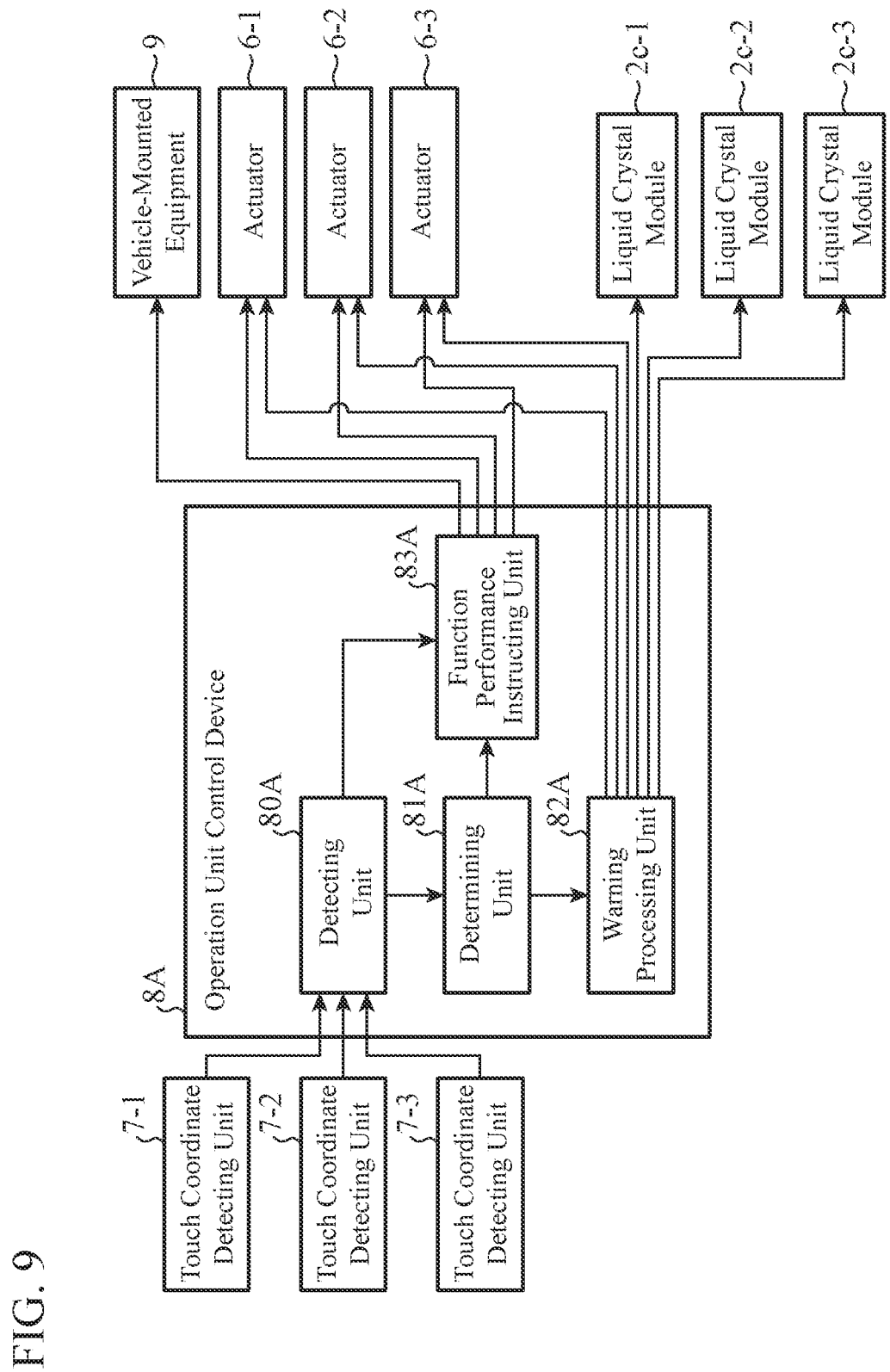
FIG. 9 is a block diagram showing the functional configuration of the operation unit control device according to Embodiment 2.

FIG. 9 is a block diagram showing the functional configuration of the operation unit control device 8A.

The operation unit control device 8A includes a detecting unit 80A, a determining unit 81A, a warning processing unit 82A, and a function performance instructing unit 83A, as shown in FIG. 9.

The detecting unit 80A detects the details of an operation using each of the knobs 3*a*-1 to 3*a*-3 and 3*b*-1 to 3*b*-3 on the basis of the coordinate position on the touch surface and the detection sensitivity level that are detected by the corresponding one of the touch coordinate detecting units 7-1 to 7-3. For example, as the details of an operation, the function corresponding to the operation and the amount of operation are detected.

The determining unit 81A determines whether or not, while an operation using a knob included in one of the operation devices 1-1 to 1-3 is being performed, an operation using a knob included in one of the remaining operation devices and corresponding to the same function is performed simultaneously, on the basis of the details of the operations, the details being detected by the detecting unit 80A.

For example, the determining unit 81A performs the determination on the basis of both the details of an operation using the knob 3*a*-1 of the operation device 1-1, the details being detected by the detecting unit 80A, and the details of an operation using the knob 3*a*-3 of the operation device 1-3, the details being detected by the detecting unit 80A.

When the knobs 3*a*-1 and 3*a*-3 are operated, a determination as to whether or not operations corresponding to the same function are being performed using both of the knobs 3*a*-1 and 3*a*-3, or a determination as to whether or not, while an operation using the knob 3*a*-1 (or the knob 3*a*-3) is being performed, an operation using the knob 3*a*-3 (or the knob 3*a*-1) and corresponding to the same function is performed is performed.

When the determining unit 81A determines that, while an operation using a knob included in one of the operation devices 1-1 to 1-3 is being performed, an operation using a knob included in one of the remaining operation devices and corresponding to the same function is performed simultaneously, the warning processing unit 82A vibrates the knobs included in the one of the remaining operation devises.

For example, when an operation using the knob 3*a*-3 included in the operation device 1-3 and corresponding to the same function is performed simultaneously while an operation using the knob 3*a*-1 included in the operation device 1-1 is being performed, the warning processing unit 82A controls the actuator 6-3 to vibrate the knobs 3*a*-3 and 3*b*-3 included in the operation device 1-3. The process of providing, in this way, vibrations for the knobs of the operation device where a prohibited operation has been performed is a warning process for the operator.

When the determining unit 81A determines that, while an operation using a knob included in one of the operation devices is being performed, an operation using a knob included in one of the remaining operation devices and corresponding to the same function is performed simultaneously, the warning processing unit 82A may change the display mode of a display device included in the one of the remaining operation devices.

For example, when an operation using the knob 3*a*-3 included in the operation device 1-3 and corresponding to the same function is performed while an operation using the knob 3*a*-1 included in the operation device 1-1 is being performed, the warning processing unit 82A shrinks or deletes the display of the function for which an operation is received using the knob 3*a*-3, out of the functions displayed on a display device included in the operation device 1-3.

Because the display mode is changed at the time that an operation corresponding to the same function is performed using the knob 3*a*-3 while an operation using the knob 3*a*-1 is being performed, the operator of the operation device 1-3 can grasp that an operation using the knob 3*a*-3 is prohibited.

The function performance instructing unit 83A instructs the vehicle-mounted equipment 9 to perform the function corresponding to the details of an operation using a knob of one of the operation devices 1-1 to 1-3, out of the functions that the vehicle-mounted equipment 9 has.

For example, in a case in which the vehicle-mounted equipment 9 is vehicle-mounted audio equipment, when an operation of controlling the volume of an audio sound is performed using the knob 3*a*-1, the function performance instructing unit 83A instructs the vehicle-mounted audio equipment to perform volume control.

Further, when an operation using each of the knobs 3*a*-1 to 3*a*-3 and 3*b*-1 to 3*b*-3 is performed, the function performance instructing unit 83A may provide tactile feedback using vibrations for the operator by controlling the corresponding one of the actuators 6-1 to 6-3.

Vibrations implementing tactile feedback have a mode different from that in the warning process, just like in Embodiment 1.

By configuring in this way, an operation feeling corresponding to an operation using each of the knobs 3*a*-1 to 3*a*-3 and 3*b*-1 to 3*b*-3 can be provided for the operator.

Next, the operations will be explained.

The detecting unit 80A detects the details of an operation using each of the knobs 3a-1 to 3a-3 and 3b-1 to 3b-3 on the basis of information inputted from the touch coordinate detecting units 7-1 to 7-3.

The determining unit 81A determines whether or not, while an operation using a knob included in one of the operation devices 1-1 to 1-3 is being performed, an operation using a knob included in one of the remaining operation devices and corresponding to the same function is performed simultaneously, on the basis of the details of the operations, the details being detected by the detecting unit 80A.

When determining that, while an operation using a knob included in one of the operation devices is being performed, an operation using a knob included in one of the remaining operation devices and corresponding to the same function is performed simultaneously, the determining unit 81A notifies the warning processing unit 82A of the determination result. When receiving the notification of the above-mentioned determination result from the determining unit 81A, the warning processing unit 82A performs a warning process.

In contrast, when determining that, while an operation using a knob included in one of the operation devices is being performed, no operation using a knob included in one of the remaining operation devices and corresponding to the same function is performed simultaneously, the determining unit 81A notifies the function performance instructing unit 83A of this determination result.

When receiving the notification of the above-mentioned determination result from the determining unit 81A, the function performance instructing unit 83A instructs the vehicle-mounted equipment 9 to perform the function corresponding to the operation using the knob.

FIG. 10 is a diagram showing an overview of the warning process in the operation devices 1-1 to 1-3.

For example, the operation device 1-1 is provided in the center console of a vehicle, the operation device 1-2 is provided in a left-hand side rear seat, and the operation device 1-3 is provided in a right-hand side rear seat. A display device 2-1 is included in the operation device 1-1, and a display device 2-2 is included in the operation device 1-2. Further, a display device 2-3 is included in the operation device 1-3.

The display device 2-1 has the touch panel 2b-1 and the liquid crystal module 2c-1, and the display device 2-2 has the touch panel 2b-2 and the liquid crystal module 2c-2. The display device 2-3 has the touch panel 2b-3 and the liquid crystal module 2c-3.

In FIG. 10, a slider 100 for volume control is displayed on each of the display devices 2-1 to 2-3. The position of the knob of the slider 100 can be moved in accordance with an operation of rotating each of the knobs 3a-1 to 3a-3 and 3b-1 to 3b-3.

For example, when the driver of the vehicle rotates the knob 3a-1 in a direction of an arrow E to move the position of the knob of the slider 100, the function performance instructing unit 83A outputs control information indicating the sound volume corresponding to the position of the knob to the vehicle-mounted audio equipment.

When receiving the control information from the function performance instructing unit 83A, the vehicle-mounted audio equipment controls the output of the audio sound in such a way that the output has the sound volume indicated by the control information.

While the driver is rotating the knob 3a-1 in a direction of an arrow E to move the position of the knob of the slider 100, an occupant in the right-hand side rear seat rotates the knob 3a-3 in a direction of an arrow F. In this case, the function corresponding to the operation of rotating the knob 3a-3 is a volume control function, and is the same as that corresponding to the operation of rotating the knob 3a-1. Therefore, the determining unit 81A determines that while an operation using the knob 3a-1 included in the operation device 1-1 is being performed, an operation using the knob 3a-3 included in the operation device 1-3 and corresponding to the same function is performed simultaneously.

When receiving a notification of the above-mentioned determination result from the determining unit 81A, the warning processing unit 82A controls the actuator 6-3 to provide vibrations 200 for the knobs 3a-3 and 3b-3 of the operation device 1-3. The occupant in the right-hand side rear seat then has a tactile feeling of the vibrations of the knobs 3a-3 and 3b-3, so that the occupant can grasp that the volume control using the operation device 1-3 is prohibited, without having to check whether or not the volume control is being performed using another operation device other than the operation device 1-3.

As a result, the occupant in the right-hand side rear seat can be guided in such a way as not to perform an operation corresponding to the same function by using the knob 3a-3 of the operation device 1-3 while an operation using the knob 3a-1 of the operation device 1-1 is being performed.

Further, in addition to the warning process of vibrating the corresponding one of the knobs 3a-1 to 3a-3 and the corresponding one of the knobs 3b-1 to 3b-3, the display mode of the corresponding one of the display devices 2-1 to 2-3 may be changed.

For example, when receiving a notification of the above-mentioned determination result from the determining unit 81A, the warning processing unit 82A controls the display device 2-3 to delete the slider 100 thereof.

From the deletion of the slider 100, the occupant in the right-hand side rear seat can grasp that the volume control using the operation device 1-3 is prohibited. As a result, the occupant in the right-hand side rear seat can be guided in such a way as not to perform an operation corresponding to the same function by using the knob 3a-3 of the operation device 1-3 while an operation using the knob 3a-1 of the operation device 1-1 is being performed.

Further, when similarly receiving a notification of the above-mentioned determination result from the determining unit 81A, the warning processing unit 82A may control the display devices 2-1 and 2-3, to enlarge the slider 100 displayed by the display device 2-1 and shrink the slider 100 displayed by the display device 2-3.

By visually recognizing the screen in which the slider 100 is shrunk, the occupant in the right-hand side rear seat can grasp that the volume control using the operation device 1-3 is prohibited.

Also in the case, the occupant in the right-hand side rear seat can be guided in such a way as not to perform an operation corresponding to the same function by using the knob 3a-3 of the operation device 1-3 while an operation using the knob 3a-1 of the operation device 1-1 is being performed.

The warning processing unit 82A may change the display mode of an area in which each of the knobs 3a-1 to 3a-3 is provided, and the display mode of an area in which each of the knobs 3b-1 to 3b-3 is provided.

For example, when providing guidance in such a way that an operation using the knob 3a-3 is not performed, the warning processing unit 82A controls the display device 2-3 to decrease the brightness of the area in which the knob 3a-3 is provided.

In this example, in a case in which the knobs 3*a*-1 to 3*a*-3 and 3*b*-1 to 3*b*-3 are each made from a transparent material, each of the knobs themselves is made to become bright or dark.

As a result, operators can be guided in such a way as not to, while performing an operation using a knob included in one of the operation devices, simultaneously perform an operation using a knob included in one of the remaining operation devices and corresponding to the same function.

The determining unit 81A may determine whether or not the function is one for which operations using two or more of the knobs 3*a*-1 to 3*a*-3 and 3*b*-1 to 3*b*-3 are allowed to be performed simultaneously (referred to as a simultaneity allowable function hereinafter).

For example, when an operation using the knob 3*a*-3 and corresponding to the same function is performed simultaneously while an operation using the knob 3*a*-1 is being performed, the determining unit 81A determines whether or not the function for which the operations are being performed is a simultaneity allowable function. When the determining unit 81A determines that the function is a simultaneity allowable function, the warning processing unit 82A does not vibrate the knobs 3*a*-3 and 3*b*-3 included in the operation device 1-3. The function performance instructing unit 83A instructs the vehicle-mounted equipment 9 to perform the function corresponding to the operations using the knobs 3*a*-1 and 3*a*-3. As a result, the vehicle-mounted equipment 9 performs the simultaneity allowable function.

When the determining unit 81A determines that the function is a simultaneity allowable function, the warning processing unit 82A does not have to change the display mode of the display device 2-3, in addition to not vibrating the knobs 3*a*-1 to 3*a*-3 and 3*b*-1 to 3*b*-3.

The operation targets of the operation devices 1-1 to 1-3 include functions for each of which operations using two or more of the knobs 3*a*-1 to 3*a*-3 and 3*b*-1 to 3*b*-3 are prohibited from being performed simultaneously (referred to as simultaneity prohibited functions hereinafter), and simultaneity allowable functions as mentioned above.

A case in which all the operation targets of the operation devices 1-1 to 1-3 are the same function and the function is a simultaneity prohibited function (e.g., volume control) will be taken as an example.

In this case, when, while an operation using a knob included in one of the operation devices is being performed, an operation using a knob included in one of the remaining operation devices and corresponding to the function is performed simultaneously, the warning processing unit 82A performs the warning process on the one of the remaining operation devices.

In addition, also when, while an operation using one knob is being performed in one operation device, an operation using the remaining knob and corresponding to the same function is performed simultaneously in the one operation device, the warning processing unit 82A performs the warning process on this operation device.

A case in which all the operation targets of the operation devices 1-1 to 1-3 are the same function and the function is a simultaneity allowable function (for example, an air conditioner temperature adjustment) will be taken as an example.

In this case, even when, while an operation using a knob included in one of the operation devices is being performed, an operation using a knob included in one of the remaining operation devices and corresponding to the function is performed simultaneously, the warning processing unit 82A does not perform the warning process.

In addition, even when, while an operation using one knob is being performed in one operation device, an operation using the remaining knob and corresponding to the same function is performed simultaneously in the one operation device, the warning processing unit 82A does not perform the warning process on this operation device.

A case in which functions that are operation targets are individually set for the operation devices 1-1 to 1-3, and in which both a simultaneity prohibited function and a simultaneity allowable function are provided as functions that are operation targets will be taken as an example.

In this case, when, while an operation using a knob included in one of the operation devices and corresponding to a simultaneity prohibited function is being performed, an operation using a knob included in one of the remaining operation devices and corresponding to the same simultaneity prohibited function is performed simultaneously, the warning processing unit 82A performs the warning process on the one of the remaining operation devices.

In addition, also when, while an operation using one knob and corresponding to a simultaneity prohibited function is being performed in one operation device, an operation using the remaining knob and corresponding to the same simultaneity prohibited function is performed simultaneously in the one operation device, the warning processing unit 82A performs the warning process on this operation device.

In contrast, even when, while an operation using a knob included in one of the operation devices and corresponding to a simultaneity allowable function is being performed, an operation using a knob included in one of the remaining operation devices and corresponding to the same simultaneity allowable function is performed simultaneously, the warning processing unit 82A does not perform the warning process.

In addition, even when, while an operation using one knob and corresponding to a simultaneity allowable function is being performed in one operation device, an operation using the remaining knob and corresponding to the same simultaneity allowable function is performed simultaneously in the one operation device, the warning processing unit 82A does not perform the warning process on this operation device.

As mentioned above, in the operation unit control device 8A according to Embodiment 2, the detecting unit 80A detects the details of an operation using each of the knob 3*a*-1 to 3*a*-3 and 3*b*-1 to 3*b*-3 included in the operation devices 1-1 to 1-3. The determining unit 81A determines whether or not, while an operation using a knob included in one of the operation devices 1-1 to 1-3 is being performed, an operation using a knob included in one of the remaining operation devices and corresponding to the same function is performed simultaneously, on the basis of the details of the operations, the details being detected by the detecting unit 80A. When the determining unit 81A determines that, while an operation using a knob included in one of the operation devices is being performed, an operation using an operation unit included in a different operation device and corresponding to the same function is performed simultaneously, the warning processing unit 82A vibrates the knobs included in the different operation device.

By configuring in this way, for example, at the time that, while an operation using the knob 3*a*-1 of the operation device 1-1 is being performed, an operation using the knob 3*a*-3 of the operation device 1-3 and corresponding to the same function is performed simultaneously, the knobs 3*a*-3 and 3*b*-3 are vibrated to warn the operator of the operation device 1-3 that a prohibited operation is performed. As a result, the operator of the operation device 1-3 can be guided in such a way as not to, while an operation using the knob 3a-1 of the operation device 1-1 is being performed, perform an operation corresponding to the same function by using the knob 3a-3 of the operation device 1-3.

In the operation unit control device 8A according to Embodiment 2, when the determining unit 81A determines that, while an operation using a knob included in one of the operation devices is being performed, an operation using a knob included in one of the remaining operation devices and corresponding to the same function is performed simultaneously, the warning processing unit 82A changes the display mode of the display device included in the one of the remaining operation devices.

By configuring in this way, for example, at the time that, while an operation using the knob 3a-1 included in the operation device 1-1 is being performed, an operation using the knob 3b-3 included in the operation device 1-3 and corresponding to the same function is performed simultaneously, the display mode of the display device 2-3 is changed.

The operator of the operation device 1-3 can grasp that he or she cannot perform an operation corresponding to the same function by using the operation device 1-3, by visually recognizing the change in the display mode.

In the operation unit control device 8A according to Embodiment 2, the function performance instructing unit 83A vibrates an operated knob in a mode different from that in the warning process, as tactile feedback for an operation using one of the knobs 3a-1, 3b-1, 3a-2, 3b-2, 3a-3, and 3b-3. By configuring in this way, an operation feeling corresponding to an operation using each of the knobs 3a-1 to 3a-3 and 3b-1 to 3b-3 can be provided for the operator.

In the operation unit control device 8A according to Embodiment 2, when the determining unit 81A determines that, while an operation using a knob included in one of the operation devices is being performed, an operation using a knob included in one of the remaining operation devices and corresponding to the same function is performed simultaneously, the determining unit 81A determines whether or not the function for which the operations are being performed is a simultaneity allowable function. When the determining unit 81A determines that the function is a simultaneity allowable function, the warning processing unit 82A does not vibrate the knobs included in the one of the remaining operation devices. As a result, a simultaneity allowable function can be performed using two or more of the knobs 3a-1 to 3a-3 and 3b-1 to 3b-3.

It is to be understood that the present disclosure is not limited to the above-mentioned embodiments, and any combination of the embodiments can be made, various changes can be made in any component according to the embodiments, and any component according to the embodiments can be omitted within the scope of the present disclosure.

INDUSTRIAL APPLICABILITY

Because the operation unit control device according to the present disclosure can guide the operator in such a way that while an operation using one of multiple operation units is being performed, the operator does not perform an operation corresponding to the same function by using one of the remaining operation units, the operation unit control device is suitable for operations on vehicle-mounted equipment.

REFERENCE SIGNS LIST

1, 1-1 to 1-3 operation device, 2, 2-1 to 2-3 display device, 2a cover glass, 2b, 2b-1 to 2b-3 touch panel, 2c, 2c-1 to 2c-3 liquid crystal module, 3a, 3a-1 to 3a-3, 3b, 3b-1 to 3b-3 knob, 4 microcomputer, 5 control board, 6, 6-1 to 6-3 actuator, 7, 7-1 to 7-3 touch coordinate detecting unit, 8, 8A operation unit control device, 8a processor, 8b ROM, 8c RAM, 9 vehicle-mounted equipment, 80, 80A detecting unit, 81, 81A determining unit, 82, 82A warning processing unit, 83, 83A function performance instructing unit, 100, 100a, 100a-1, 100b, 100b-1 slider, and 200 vibrations.

The invention claimed is:

1. An operation unit control device comprising:
a processor to execute a program; and
a memory to store the program which, when executed by the processor, performs processes of,
detecting details of operations using two or more respective operation units included in an operation device;
determining whether or not, while an operation using one of the operation units is being performed, an operation using a remaining one of the operation units and corresponding to a function identical with that corresponding to the operation using the one of the operation units is performed simultaneously, on a basis of the details of the operations, the details being detected; and
using a same actuator to vibrate the operation units when it is determined that while the operation using the one of the operation units is being performed, the operation using the remaining one of the operation units and corresponding to the function identical with that corresponding to the operation using the one of the operation units is performed simultaneously
wherein the operation units are physically connected to the operation device such that the operation device includes circuitry to convert physical manipulations of the operation units into electrical signals that are used to detect respective operations using the operation units.

2. The operation unit control device according to claim 1, wherein the processes further include when it is determined that while the operation using the one of the operation units is being performed, the operation using the remaining one of the operation units and corresponding to the function identical with that corresponding to the operation using the one of the operation units is performed simultaneously, changing a display mode of a display device included in the operation device.

3. The operation unit control device according to claim 1, wherein the processes further include when, while the operation using the one of the operation units is being performed, the operation using the remaining one of the operation units and corresponding to the function identical with that corresponding to the operation using the one of the operation units is performed simultaneously, determining whether or not the function for the operations simultaneously performed is a simultaneity allowable function for which operations using the respective operation units are allowed to be performed simultaneously, and
when it is determined that the operations simultaneously performed are ones for the simultaneity allowable function, the operation units do not vibrate.

4. The operation unit control device according to claim 1, wherein the processes further include instructing electronic equipment to perform a function corresponding to an operation, and vibrating in a mode different from that in a warning process, as tactile feedback for an operation using the one of the operation units.

5. An operation unit control method comprising:
detecting details of operations using two or more respective operation units included in an operation device;

determining whether or not, while an operation using one of the operation units is being performed, an operation using a remaining one of the operation units and corresponding to a function identical with that corresponding to the operation using the one of the operation units is performed simultaneously, on a basis of the details of the operations, the details being detected; and using a same actuator to vibrate the operation units when it is determined that while the operation using the one of the operation units is being performed, the operation using the remaining one of the operation units and corresponding to the function identical with that corresponding to the operation using the one of the operation units is performed simultaneously, wherein the operation units are physically connected to the operation device such that the operation device includes circuitry to convert physical manipulations of the operation units into electrical signals that are used to detect respective operations using the operation units.

* * * * *